(12) United States Patent
Zhu et al.

(10) Patent No.: US 11,477,387 B2
(45) Date of Patent: Oct. 18, 2022

(54) TERMINAL DEVICE AND SHOOTING METHOD

(71) Applicant: BEIJING XIAOMI MOBILE SOFTWARE CO., LTD., Beijing (CN)

(72) Inventors: Heming Zhu, Beijing (CN); Gaocai Han, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 319 days.

(21) Appl. No.: 16/793,631

(22) Filed: Feb. 18, 2020

(65) Prior Publication Data
US 2021/0136293 A1    May 6, 2021

(30) Foreign Application Priority Data
Oct. 31, 2019   (CN) .......................... 201911051143.4

(51) Int. Cl.
*H04N 5/232* (2006.01)
*H04M 1/02* (2006.01)
*H04N 5/225* (2006.01)

(52) U.S. Cl.
CPC ...... *H04N 5/23299* (2018.08); *H04M 1/0264* (2013.01); *H04N 5/2253* (2013.01); *H04M 2250/20* (2013.01); *H04M 2250/52* (2013.01)

(58) Field of Classification Search
CPC ............. H04N 5/23299; H04N 5/2253; H04N 5/2251; H04N 5/2257; H04M 1/0264; H04M 2250/20; H04M 2250/52; H04M 1/0235; G06F 1/1686
See application file for complete search history.

(56) References Cited

U.S. PATENT DOCUMENTS

| 5,815,759 A * | 9/1998 | Tseng .................. H04N 5/2259 348/E5.025 |
| 7,369,175 B2 * | 5/2008 | Kim .................... H04M 1/0218 348/E5.025 |

FOREIGN PATENT DOCUMENTS

| CN | 108600596 A | 9/2018 |
| CN | 109302552 A | 2/2019 |
| CN | 109995915 A | 7/2019 |

OTHER PUBLICATIONS

Extended European Search Report dated Jul. 31, 2020 in European Patent Application No. 20160708.2, 8 pages.

* cited by examiner

Primary Examiner — Mekonnen D Dagnew
(74) Attorney, Agent, or Firm — Oblon, McClelland, Maier & Neustadt, L.L.P.

(57) ABSTRACT

A terminal device and a shooting method are provided. The terminal device includes a main body, a driving component, a camera component, and a connection element. The driving component is mounted on the main body. The camera component is connected to the connection element. The connection element is rotatably mounted on the driving component. The driving component is configured to place the camera component at a first position or a second position by driving the connection element and the camera component can perform compound motion relative to the main body. The compound motion includes linear and rotational sub-motion. In the disclosure, the driving component drives the camera component to perform rotational motion, so as to change a shooting angle of the camera component.

19 Claims, 5 Drawing Sheets

TERMINAL DEVICE AND SHOOTING METHOD

CROSS-REFERENCE TO RELATED APPLICATIONS

This application is based upon and claims priority to Chinese Patent Application No. 201911051143.4, filed on Oct. 31, 2019, the entire content of which is incorporated herein by reference.

TECHNICAL FIELD

The disclosure relates to the field of electronic devices, and more particularly, to a terminal device and a shooting method.

BACKGROUND

Terminal devices, such as mobile phones and tablets, have now become an indispensable part of people's daily lives. Shooting images, as an important function of a terminal device, has increasingly attracted the attention of various manufacturers. Cameras of the terminal device usually include a front camera and a rear camera, both of which are fixedly disposed in a housing of the terminal device. When an image is to be captured for a side object, a user is usually required to turn their body and rotate the terminal device before shooting, which can result in a poor user experience. Moreover, in some extreme scenarios, it may be inconvenient for the user to turn their body, such as at a tourist spot with a difficult terrain.

SUMMARY

A terminal device and a shooting method capable of shooting images or video at different angles are provided in the disclosure.

A terminal device provided in the disclosure includes a main body, a driving component, a camera component, and a connection element. The driving component is mounted on the main body. The camera component is connected to the connection element. The connection element is rotatably mounted on the driving component. The driving component can be configured to place the camera component at a first position or a second position by driving the connection element and the camera component to perform compound motion relative to the main body. The compound motion includes linear sub-motion and rotational sub-motion.

In another aspect, the shooting method can include receiving a shooting instruction from a user, turning on a camera component to start shooting, driving, by a driving component, the camera component to rotate by a preset angle, and turning off the camera component to stop shooting.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Reference will now be made in detail to exemplary embodiments, examples of which are illustrated in the accompanying drawings. The following description refers to the accompanying drawings in which the same numbers in different drawings denote the same or similar elements unless otherwise represented. The implementations set forth in the following description of exemplary embodiments do not mean all implementations consistent with the disclosure. Instead, they are merely examples of apparatuses consistent with aspects related to the disclosure as recited in the appended claims.

The terms used in the disclosure are for the purpose of describing particular embodiments only, and are not intended to limit the disclosure. Unless otherwise defined, technical terms or scientific terms used in the disclosure should be understood in the ordinary meaning of those of ordinary skill in the art to which the disclosure pertains. The words "first," "second," and the like used in the specification and claims of the disclosure are not intended to indicate any order, quantity or importance, but only to distinguish different components. Similarly, the words "a," "an," or the like do not denote any quantitative limitation, but mean that there is at least one. "Multiple" or "several" means two or more. Unless stated otherwise, words such as "front," "rear," "lower," and/or "upper" are just for convenience of explanation, and are not limited to a position or a spatial orientation. Words such as "comprise" or "include" mean that elements or objects preceding "comprise" or "include" encompass listed elements or objects following "comprise" or "include", and their equivalents, and do not exclude other elements or objects. Words such as "connect" or "connected" are not limited to physical or mechanical connections, and may include electrical connections, whether direct or indirect. "A/an," "the," and "this" in a singular form in the specification and the appended claims of the disclosure are also intended to include a plural form, unless other meanings are clearly indicated in the context. It is also to be understood that the term "and/or" used in the disclosure refers to and includes any or all possible combinations of one or more associated items that are listed.

With reference to FIG. 1 to FIG. 6, a terminal device is provided in the disclosure. The terminal device is an electronic device such as a mobile phone, a tablet and a laptop. The terminal device includes a main body, a driving component, a connection element, and a camera component. The driving component is mounted on the main body. The camera component is connected to the connection element. The connection element is rotatably mounted on the driving component. The driving component is configured to drive the connection element and the camera component to perform compound motion relative to the main body. The compound motion includes linear and rotational sub-motion.

Figure 1:
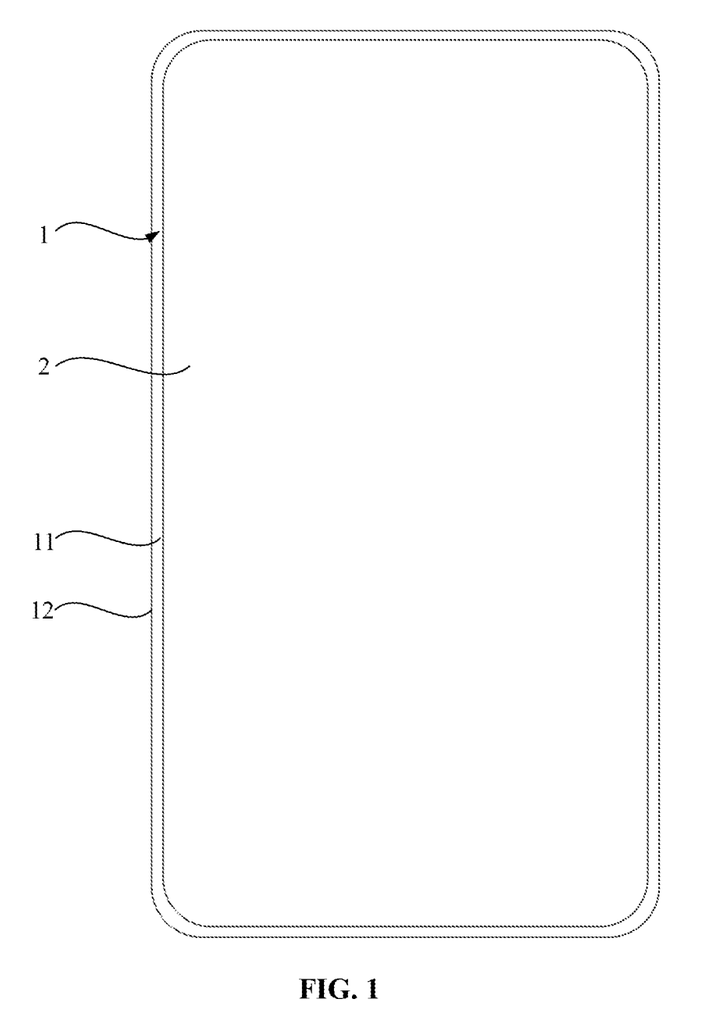
FIG. 1 illustrates a schematic front view of a terminal device according to an exemplary embodiment of the disclosure, where a camera component is located at a first position.
Figure 2:
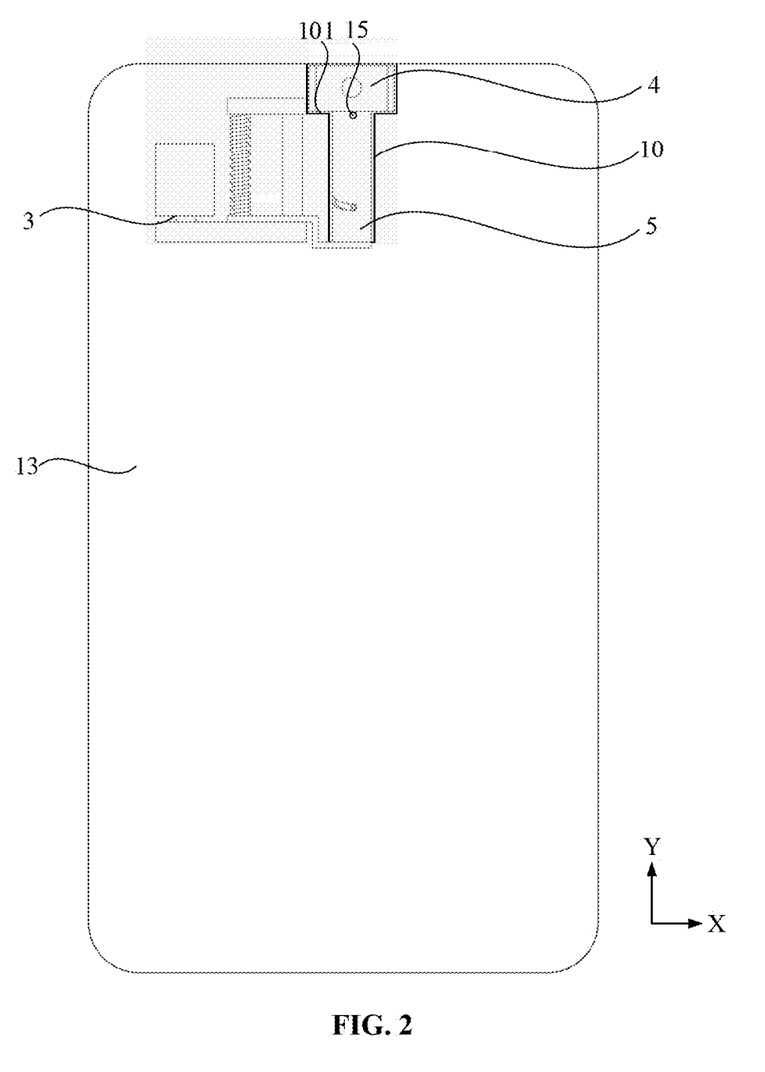
FIG. 2 illustrates a schematic rear view of the terminal device illustrated in FIG. 1, where part of a rear housing is transparent for ease of understanding.

With reference to FIG. 1 and FIG. 2, the terminal device of this exemplary embodiment is a mobile phone, which includes a main body, a driving component 3, a camera component 4, and a connection element 5. The main body includes a housing 1 and a display screen 2 mounted on the housing 1. Of course, the main body also includes elements such as a mainboard, a processor, a memory, and a battery. The housing 1 includes a front housing 11, a middle frame 12, a rear housing 13, and other internal brackets (not illustrated) with supporting functions. The front housing 11, the middle frame 12 and the rear housing 13 may be made of the same material and may also be made of different materials. For example, the front housing 11 and the inner brackets are made of plastic, and the middle frame 12 and the rear housing 13 are made of metal.

The driving component 3 is mounted on the housing 1. The camera component 4 is connected to the connection element 5. The connection element 5 is rotatably mounted on the driving component 3. The driving component 3 is configured to place the camera component 4 at a first position (with reference to FIG. 1 and FIG. 2) or a second position (with reference to FIG. 6) by driving the connection element 5 and the camera component 4 to perform compound motion relative to the main body. The camera component 4 is configured to acquire images at different angles when located at the first position and the second position.

In this embodiment, the housing 1 is provided with a receiving cavity 10. The receiving cavity 10 is substantially "T"-shaped and penetrates through the middle frame 12 and the rear housing 13. When the camera component 4 is located at the first position, the camera component 4 and the connection element 5 are received in the receiving cavity 10 and is oriented opposite to a display surface of the terminal device for rear shooting. When the camera component 4 is located at the second position, the camera component 4 protrudes out of the receiving cavity 10, and is oriented identically to the display surface of the terminal device, and the connection element 5 partially protrudes out of the receiving cavity 10 for front shooting. The front here may be understood as where a display surface of the display screen 2 face towards, and where an outer surface of the rear housing 13 face towards is the rear. That is, the camera component is rotated by 180 degrees during switching between the first position and the second position. In one embodiment, the receiving cavity may not be provided, leaving the camera component exposed at rear of the rear housing 13. In other embodiments, during switching between the first position and the second position, the camera component 4 may be rotated by an angle less than 180 degrees or an angle greater than 180 degrees, for example 360 degrees. During the rotation of the camera component 4 by, for example, 360 degrees, continuous shooting can be achieved, thereby obtaining a 360-degree panoramic image.

Figure 3:
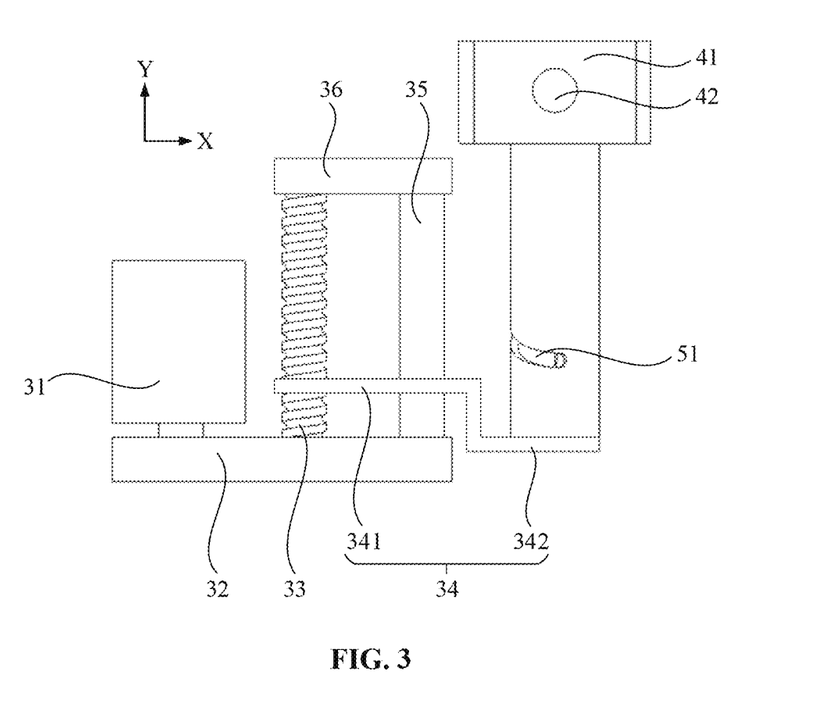
FIG. 3 illustrates a schematic rear view of a driving component, the camera component and a connection element of the terminal device illustrated in FIG. 1.

With reference to FIG. 3, the driving component 3 includes a motor 31, a transmission mechanism, and a power output unit 34. The transmission mechanism is in power connection to the motor 31 and the power output unit 34. Optionally, the motor is a stepping motor which may locate the camera component anywhere between the first position and the second position. The transmission mechanism includes a speed change mechanism 32 and a screw rod 33. One end of the screw rod 33 is connected to the speed change mechanism 32 and the other end of the screw rod is rotatably mounted on a bracket 36. The bracket 36 may be part of the housing or a member fixed on the housing 1. The power output unit 34 includes a power input portion 341 and a power output portion 342 connected to the power input portion 341. The power input portion 341 includes an internal thread cooperating with the screw rod 33. Through the cooperation between the internal thread and the screw rod 33, rotational motion of the screw rod 33 is converted into linear motion of the power output unit 34. The connection element 5 is rotatably mounted on the power output portion 342 by, for example, means of clearance riveting. In this embodiment, the motor 31 is a stepping motor, and the speed change mechanism 32 is a speed reduction mechanism. In other embodiments, the speed change mechanism may not be provided.

Preferably, the driving component 3 further includes a guide rod 35. One end of the guide rod 35 is mounted on a speed change housing of the speed change mechanism 32, and the other end of the guide rod is rotatably mounted on the bracket 36. The power input portion 341 is provided with a guide groove cooperating with the guide rod 35. The guide rod 35 is configured to guide the power output unit 34 and is disposed in parallel with the screw rod 33, thereby ensuring that a moving direction of the connection element 5 is the same as a moving direction of the power output unit 34. The guide rod 35 and the screw rod 33 both extend in a first direction Y, and the first direction Y is also a lengthwise direction of the terminal device.

Figure 4:
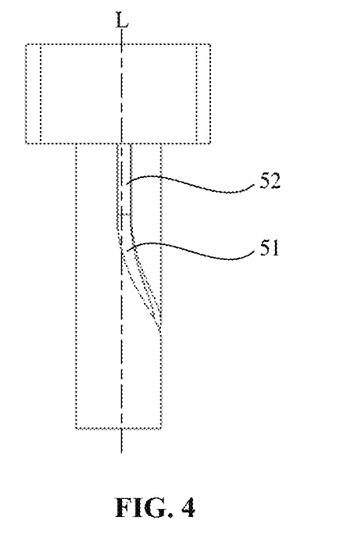
FIG. 4 illustrates a schematic front view of the camera component and the connection element of the terminal device illustrated in FIG. 1.
Figure 5:
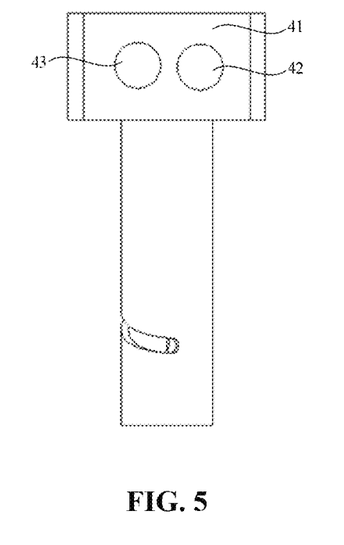
FIG. 5 illustrates a schematic rear view of the camera component and the connection element according to another exemplary embodiment of the disclosure.
Figure 6:
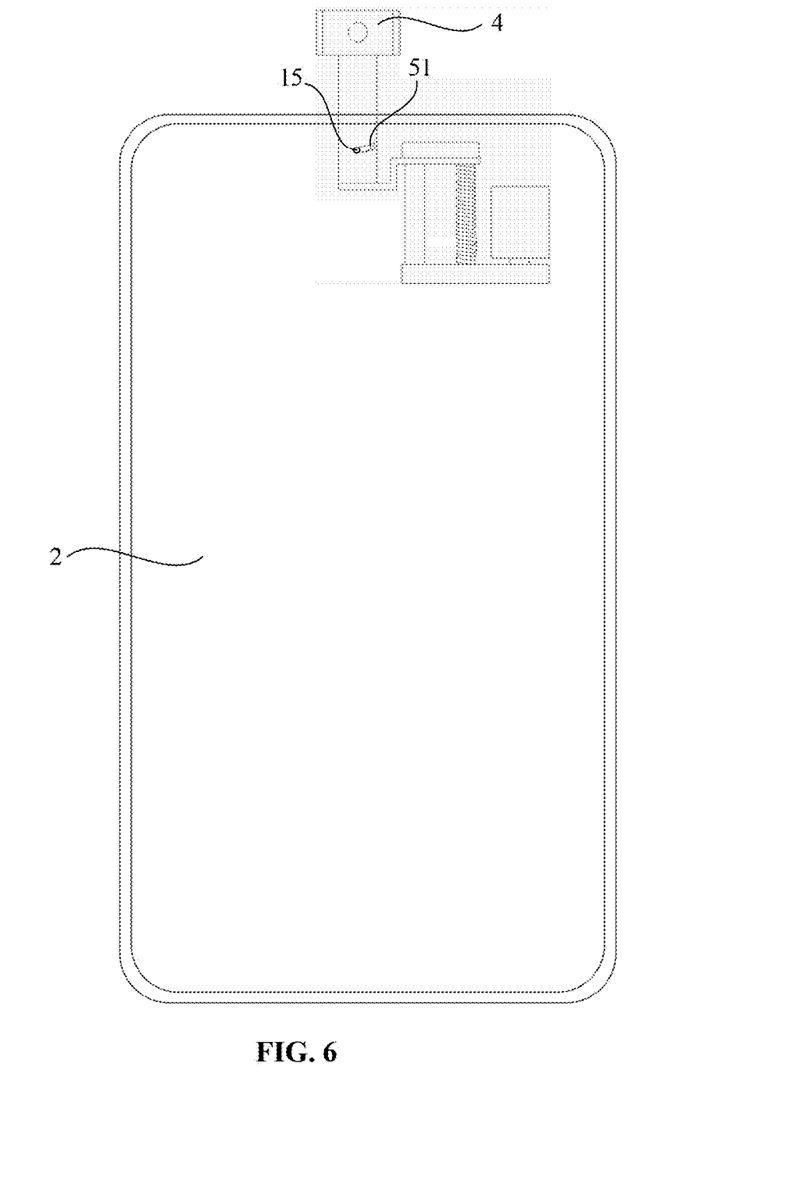
FIG. 6 illustrates a schematic front view of an exemplary embodiment of the terminal device of the disclosure, where the camera component is located at a second position.

With reference to FIG. 3 and FIG. 4, the camera component 4 includes a shell 41 and a first camera 42 mounted on the shell 41. Of course, the camera component further includes electronic elements such as a circuit board disposed inside the shell 41. With reference to FIG. 5, in another embodiment, the camera component further includes a second camera 43, and the first camera 42 and the second camera 43 are arranged in a second direction X (that is, a widthwise direction of the terminal device). In other embodiments, the camera component may further include at least one of an infrared sensor, a proximity light sensor, and an ambient light sensor, which are respectively configured to emit an infrared signal, detect whether an object is proximate or detect the intensity of ambient light.

The housing 1 includes a first guide portion, and the connection element 5 includes a second guide portion. When the driving component 3 drives the connection element 5, the first guide portion cooperates with the second guide portion and slides relative to the second guide portion, to enable the connection element 5 and the camera component 4 to perform compound motion relative to the main body. With continued reference to FIG. 3 and FIG. 4, in this embodiment, the first guide portion includes a guide column 15. The second guide portion includes a first guide groove 51 and a second guide groove 52 communicated with the first guide groove 51. When the driving component 3 drives the connection element 5, the first guide groove 51 and the second guide groove 52 cooperate with the guide column 15 and move relative to the guide column 15, respectively. The receiving cavity 10 includes a supporting surface 101 for supporting the camera component 4, and the guide column 15 is flush with the supporting surface 101. Of course, in other embodiments, the position of the guide column 15 may also be adjusted according to stroke requirements of the camera component.

The connection element 5 is substantially cylindrical. The second guide groove 52 extends in the first direction Y. The first guide groove 51 is arranged around an axis L, about which the camera component 4 rotates (the axis L also extends in the first direction Y), and a distance from one end of the first guide groove 51 in the first direction Y to the camera component 4 is not equal to a distance from the other end of the first guide groove in the first direction to the camera component.

When the second guide groove 52 and the guide column 15 cooperate with each other and perform relative motion, the connection element 5 and the camera component 4 perform linear motion in the first direction Y. When the guide column 15 enters the first guide groove 51 from the second guide groove 52, the first guide groove 51 and the guide column 15 cooperate with each other and perform relative motion. Since the first guide groove 51 is arranged around the axis L and a distance from one end of the first guide groove 51 in the first direction Y to the camera component 4 is not equal to a distance from the other end of the first guide groove in the first direction to the camera component, the motion of the connection element 5 and the camera component 4 includes both rotational sub-motion around the axis L and linear sub-motion in the first direction Y. That is, when the first guide groove 51 moves relative to the guide column 15, the connection element 5 performs compound motion. Preferably, the first guide groove 51 is tangent to the second guide groove 52, to enable the process of the guide column 15 entering the first guide groove from the second guide groove 52 to be steadier.

The purpose of providing the second guide groove 52 is to enable the camera component 4 to perform compound motion after protruding out of the receiving cavity 10, so as to prevent the motor from being burnt out due to that the camera component 4 is stuck in the receiving cavity 10 when rotating in the receiving cavity 10. For example, if a linear driving component and a rotational driving component are used to achieve linear motion and rotational motion respectively, the misoperation of the rotational driving component can cause the camera component 4 to be stuck. Therefore, a driving structure of the camera component 4 (including the driving component 3 and the connection element 5) of the disclosure is more reliable. Correspondingly, a size of the second guide groove 52 in the first direction Y is no smaller than a size of the camera component 4 in the first direction Y, thereby ensuring that the camera component 4 completely protrudes out of the receiving cavity 10 when the guide column 15 enters the first guide groove 51. In other embodiments, the second guide groove may not be provided, but the thickness of the camera component 4 needs to be no less than its width; in this way, the camera component 4 is allowed to rotate in the receiving cavity 10, so that the camera component 4 cannot be stuck.

Optionally, an orthogonal projection of the first guide groove 51 on the camera component 4 is a semicircle, that is, during the process of the camera component 4 switching from the first position to the second position, the connection element 5 and the camera component 4 have rotated by 180 degrees in total. When the driving component 3 does not drive the connection element 5, the camera component 4 is oriented opposite to a display surface of the terminal device, for rear shooting, and after the camera component has rotated by 180 degrees, the camera component 4 is oriented identically to the display surface of the terminal device, for front shooting, so that the camera component is shared between front shooting and rear shooting. In other embodiments, the orthogonal projection of the first guide groove 51 on the camera component 4 may also be less than or greater than a semicircle, thereby reducing or expanding the range of shooting.

When the orthogonal projection of the first guide groove 51 on the camera component 4 is a full circle, the camera component 4 and the connection element 5 have rotated by at least 360 degrees (if the rotation angle is greater than 360 degrees, the projection will still be a full circle). When a user needs to take a panoramic shot, there is no need to move the terminal device or turn their body, and it is only needed to control, through a control interface of the terminal device, the camera component 4 to rotate by 360 degrees during the shooting process, thereby completing the 360-degree panoramic shot. Of course, in order to enable a panoramic image to have no significant height difference, the size of the first guide groove 51 in the first direction Y may be reduced.

In one embodiment, the connection element is provided with a first guide column, and the main body is provided with a first guide groove and a second guide groove cooperating with the first guide column. In another embodiment, the first guide portion includes a protrusion extending along a trajectory of the compound motion (the shape of the protrusion is similar to the composite shape of the first guide groove and the second guide groove in the foregoing embodiment, and the difference only lies in that the shape in this embodiment is convex while the shape in the foregoing embodiment is concave). The second guide portion includes a notch cooperating with the protrusion. The protrusion slides relative to the notch when the camera component performs the compound motion, that is, different regions of the protrusion respectively cooperating with the notch.

In another aspect, an exemplary shooting method for the terminal device according to any one of the foregoing embodiments is also provided in the disclosure. The shooting method can include the following steps.

In step S1, a shooting instruction is received from a user. In step S2, a camera component is turned on to start shooting. In step S3, a driving component drives the camera component to rotate by a preset angle. Optionally, the preset angle may be any angle greater than 0 degree and no greater than 360 degrees. In order to obtain a panoramic image of a wide imaging range, the preset angle is preferably no less than 180 degrees. In step S4, the camera component is turned off to stop shooting.

The camera component and the driving component may be controlled by a processor of the terminal device. In the disclosure, the driving component drives the camera component to perform compound motion, so as to change a shooting angle of the camera component. Shooting can be conducted at different angles without moving the terminal device, the range of shooting for the terminal device is expanded, and the user experience is improved.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

The above are merely preferred embodiments of the disclosure, and do not limit the disclosure in any form. Although the disclosure has been disclosed in the preferred embodiment as above, it is not intended to limit the disclosure. Those skilled in the art may use the technical content disclosed above to make some variations or modifications as equivalent embodiments of equivalent changes, without departing from the scope of the technical solutions of the disclosure. Any content not departing from the technical solutions of the disclosure, any simple alterations, equivalent changes and modifications made to the above embodiments according to the technical essence of the disclosure still fall within the scope of the technical solution of the disclosure.

What is claimed is:

1. A terminal device, comprising:
a main body;
a driving component that is mounted on the main body;
a connection element that is rotatably mounted on the driving component; and
a camera component that is connected to the connection element,
wherein the driving component is configured to place the camera component at a first position or a second position by driving the connection element and the camera component to perform compound motion relative to the main body, the compound motion including linear sub-motion and rotational sub-motion;
wherein the driving component further comprises a motor, a transmission mechanism, and a power output unit, the transmission mechanism is in power connection to the motor and the power output unit, and the connection element is rotatable mounted on the power output unit.

2. The terminal device according to claim 1, wherein the main body further comprises a receiving cavity, wherein:
when the camera component is at the first position, the camera component is received in the receiving cavity and is oriented opposite to a display surface of the terminal device, or
when the camera component is at the second position, the camera component protrudes out of the receiving cavity and is oriented identically to the display surface of the terminal device.

3. The terminal device according to claim 2, wherein:
the main body further comprises a first guide portion,
the connection element further comprises a second guide portion, and
when the driving component drives the connection element, the first guide portion cooperates with the second guide portion and slides relative to the second guide portion, to enable the connection element and the camera component to perform compound motion relative to the main body.

4. The terminal device according to claim 3, wherein:
the first guide portion further comprises a protrusion extending along a trajectory of the compound motion, the second guide portion further comprises a notch cooperating with the protrusion, and the protrusion slides relative to the notch when the camera component performs the compound motion.

5. The terminal device according to claim 3, wherein:
one of the first guide portion and the second guide portion further comprise a guide column, and
another one of the first guide portion and the second guide portion further comprise a first guide groove cooperating with the guide column, and
the first guide groove is arranged around an axis, about which the camera component rotates, and a distance from one end of the first guide groove to the camera component is different than a distance from another end of the first guide groove to the camera component.

6. The terminal device according to claim 5, wherein:
the first guide portion further comprises a guide column, and the second guide portion further comprises a guide groove,
the main body includes a receiving cavity for receiving the camera component and the connection element,
the receiving cavity includes a supporting surface for supporting the camera component, and
the guide column is flush with the supporting surface.

7. The terminal device according to claim 5, wherein:
the connection element further comprises the first guide groove and a second guide groove communicated with the first guide groove,
the second guide groove extends in a first direction of the linear sub-motion, and
the driving component is configured to drive the connection element and the camera component to perform linear motion and compound motion in sequence, a direction of the linear motion being the same as a direction of the linear sub-motion.

8. The terminal device according to claim 7, wherein the first guide groove is tangent to the second guide groove.

9. The terminal device according to claim 7, wherein a size of the second guide groove in the first direction is no smaller than a size of the camera component in the first direction.

10. The terminal device according to claim 5, wherein an orthogonal projection of the first guide groove on the camera component is a semicircle.

11. The terminal device according to claim 1, wherein:
the transmission mechanism further comprises a speed change mechanism connected to the motor, and a screw rod in power connection to the speed change mechanism;
the power output unit further comprises a power input portion and a power output portion, and the power input portion includes an internal thread cooperating with the screw rod;
the connection element is rotatably mounted on the power output portion; and
the driving component drives, through the speed change mechanism and the screw rod, the power output unit to perform linear motion.

12. The terminal device according to claim 11, wherein:
the driving component further comprises a guide rod,
the power input portion includes with a guide groove cooperating with the guide rod, and
the guide rod is configured to guide the power output unit and is disposed in parallel with the screw rod.

13. A shooting method, applied to a terminal device, comprising:
- receiving a shooting instruction from a user;
- turning on a camera component to start shooting;
- driving, by a driving component, the camera component to move; and
- turning off the camera component to stop shooting,
- wherein driving, by the driving component, the camera component to move comprises:
- driving, by the driving component, a connection element and the camera component to perform compound motion relative to a main body of the terminal device, so as to place the camera component at a first position or a second position, the compound motion including linear sub-motion and rotational sub-motion, wherein the driving component is mounted on the main body, the camera component is connected to the connection element, and the connection element is rotatably mounted on the driving component;
- wherein the driving component further comprises a motor, a transmission mechanism, and a power output unit, the transmission mechanism is in power connection to the motor and the power output unit, and the connection element is rotatably mounted on the power output unit.

14. The shooting method according to claim 13, wherein driving, by the driving component, the camera component to move further comprises:
- when the camera component is at the first position, enabling the camera component to be received in a receiving cavity and to be oriented opposite to a display surface of the terminal device; or
- when the camera component is at the second position, enabling the camera component to protrude out of the receiving cavity and to be oriented identically to the display surface of the terminal device.

15. The shooting method according to claim 14, wherein driving, by the driving component, the connection element and the camera component to perform the compound motion relative to the main body further comprises:
- enabling a first guide portion of the main body to cooperate with a second guide portion of the connection element and to slide relative to the second guide portion, to enable the connection element and the camera component to perform compound motion relative to the main body.

16. The shooting method according to claim 15, wherein driving, by the driving component, the camera component to move further comprises:
- driving, by the driving component, the connection element and the camera component to perform linear motion and compound motion in sequence, a direction of the linear motion being the same as a direction of the linear sub-motion.

17. The shooting method according to claim 15, wherein:
- the first guide portion includes a protrusion extending along a trajectory of the compound motion, and the second guide portion includes a notch cooperating with the protrusion, and
- driving, by the driving component, the connection element and the camera component to perform the compound motion relative to the main body further includes enabling the protrusion of the first guide portion to slide relative to the notch of the second guide portion, to enable the camera component to perform the compound motion.

18. The shooting method according to claim 13, wherein the driving component drives the camera component to rotate by a preset angle, and the preset angle is at least one of the following:
- any angle greater than 0 degree and not greater than 360 degrees;
- an angle not smaller than 180 degrees; or
- an angle of 360 degrees.

19. The shooting method according to claim 13, wherein the shooting method further comprises at least one of the following:
- operating the camera component to emit an infrared signal;
- detecting whether an object is proximate; or
- detecting the intensity of ambient light.

* * * * *